United States Patent
Lee

(10) Patent No.: US 8,923,689 B2
(45) Date of Patent: Dec. 30, 2014

(54) IMAGE PROCESSING APPARATUS AND METHOD

(75) Inventor: Jung-sook Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 445 days.

(21) Appl. No.: 13/286,722

(22) Filed: Nov. 1, 2011

(65) Prior Publication Data

US 2012/0155839 A1 Jun. 21, 2012

(30) Foreign Application Priority Data

Dec. 17, 2010 (KR) ........................ 10-2010-0129633

(51) Int. Cl.
H04N 5/783 (2006.01)
H04N 19/40 (2014.01)
H04N 13/00 (2006.01)
H04N 19/597 (2014.01)

(52) U.S. Cl.
CPC ..... *H04N 13/0055* (2013.01); *H04N 19/00472* (2013.01); *H04N 19/00769* (2013.01)
USPC ....................................................... 386/347

(58) Field of Classification Search
CPC . H04N 5/783; H04N 9/8042; H04N 21/4325; H04N 21/440281; H04N 5/765
See application file for complete search history.

(56) References Cited

U.S. PATENT DOCUMENTS

2004/0252970 A1 12/2004 Noh et al.
2009/0129689 A1* 5/2009 Boyce ......................... 382/236
2010/0150523 A1 6/2010 Okubo et al.
2010/0289875 A1 11/2010 Newton et al.
2011/0157302 A1* 6/2011 Glen .............................. 348/42

FOREIGN PATENT DOCUMENTS

KR 10-2004-0106823 A 12/2004
WO 99/56471 A2 11/1999

OTHER PUBLICATIONS

European Search Report, dated Sep. 12, 2011, issued in Application No. 11170502.6.
"Advanced video coding for generic audiovisual services; H.264 (Mar. 2010)" ITU-T Standard, International Telecommunication Union, Mar. 9, 2010, pp. 1-676.
Puri, et al., "Basics of stereoscopic video, new compression results with MPEG-2 and a proposal for MPEG-4", Signal Processing: Image Communication, vol. 10, No. 1-3, Jul. 1997, pp. 201-234.
Merkle, Philipp, et al., "Efficient Prediction Structures for Multiview Video Coding", IEEE Transactions on Circuits and Systems for Video Technology, vol. 17, No. 11, Nov. 1, 2007, pp. 1461-1473.
Vetro, Anthony, et al., "Joint Multiview Video Model (JMVM) 8.0", Joint Video Team (JVT) of ISO/IEC MPEG & ITU-T VCEG 27th Meeting: Geneva, CH, Apr. 23-29, 2008, 1-11 pages.

* cited by examiner

*Primary Examiner* — William C Vaughn, Jr.
*Assistant Examiner* — Daniel Tekle
(74) *Attorney, Agent, or Firm* — Sughrue Mion, PLLC

(57) ABSTRACT

Provided are an image processing apparatus and an image processing method. The image processing apparatus includes: a video receiver which receives a stream including first- and second-eye images, the first-eye image being a P frame or a B frame; a decoding unit which performs a first decoding of the first- and second-eye images; an encoding unit which encodes the first-decoded first- and second-eye images; and a controller which controls the encoding unit to encode the first-eye image into an I frame, and controls the decoding unit to second decode the encoded the first- and second-eye images at a reverse playing.

13 Claims, 7 Drawing Sheets

IMAGE PROCESSING APPARATUS AND METHOD

CROSS-REFERENCE TO RELATED APPLICATION

This application claims priority from Korean Patent Application No. 10-2010-0129633, filed on Dec. 17, 2010 in the Korean Intellectual Property Office, the disclosure of which is incorporated herein by reference in its entirety.

BACKGROUND

1. Field

Apparatuses and methods consistent with exemplary embodiments relate to an image processing apparatus and method, and more particularly, to an image processing apparatus and method for a constant-speed reverse play in a moving picture experts group (MPEG) stream adopted by a high definition three-dimensional (3D) image playing medium.

2. Description of the Related Art

Moving picture compression technology for MPEG video defines technology for compressing and restoring images for a moving picture.

In general, an MPEG video player receives a compressed MPEG video stream from a digital video data storage medium such as a digital versatile disc (DVD), a hard disk drive, or the like, and restores the video stream through a video decoder, thereby performing a general playing operation or a reverse playing operation.

In a related art, various trick modes are supported for playing a stored image. Through this trick mode operation, a user can select a play speed such as 2×, 3×, 4×, etc. Further, a reverse play is also possible with 2×, 3×, 4× or the like speed.

An MPEG stream adopted in a 3D image includes an independently decodable image and an image referring to another image. Specifically, the MPEG stream is configured in such a manner that not only an image refers to within a corresponding pair of a left image and a right image, but also a frame of the right image refers to the left image. In the case of the reverse play, image group units are input in reverse order, and pictures provided in each image group follow a decoding order. Accordingly, there is a lot of difficulty in achieving a constant-speed reverse play as compared with other trick modes.

SUMMARY

Accordingly, one or more exemplary embodiments provide an image processing apparatus and method, in which a constant-speed reverse play is possible at any location of a moving picture experts group (MPEG) stream adopted by a high definition three-dimensional (3D) image playing medium, thereby providing a smooth constant-speed reverse play without discontinuity of a screen.

According to an aspect of an exemplary embodiment, there is provided an image processing apparatus including: a video receiver which receives a stream including a first-eye image and a second-eye image, corresponding to a frame of a 3D image, wherein the first-eye image is one of a P frame and a B frame; a decoding unit which performs a first decoding of the first-eye image and the second-eye image and a second decoding of the first-eye image and the second-eye image for reverse playing of the stream; an encoding unit which encodes the first decoded first-eye image and the first decoded second-eye image; and a controller which controls the encoding unit to encode the first decoded first-eye image into an I frame, and controls the decoding unit to decode the encoded first-eye image and the encoded second-eye image at the reverse playing.

One of the first-eye image and the second-eye image may be a base image, and another one of the first-eye image and the second-eye image is a dependent image dependent on the base image, and the controller may control the encoding unit to encode the base image into an I frame.

The controller may control the encoding unit to encode the dependent image into a P frame that refers to the encoded base image, and the first decoded second-eye image may be the dependent image.

The controller may control the encoding unit to encode the dependent image into an I, and the first decoded second-eye image is the dependent image.

According to an aspect of an exemplary embodiment, there is provided an image processing method including: receiving a stream including a first-eye image and a second-eye image, corresponding to a frame of a 3D image, wherein the first-eye image is one of a P frame and a B frame; performing a first decoding of the first-eye image and the second-eye image; encoding the first decoded first-eye image and the first decoded second-eye image in response to a reverse playing operation of the stream; and performing a second decoding of the encoded first-eye image and the encoded second-eye image in response to the reverse playing operation of the stream, wherein the encoding comprises encoding the first decoded first-eye image into an I frame.

One of the first decoded first-eye image and the first decoded second-eye image may be a base image, and another of the first decoded first-eye image and the first decoded second-eye image may be a dependent image dependent on the base image, and the base image may be encoded into an I frame in the encoding.

The first decoded second-eye image may be the dependent image, and the encoding may further include encoding the dependent image into a P frame that refers to the encoded base image.

The first decoded second-eye image is the dependent image, and the encoding may further include encoding the dependent image into an I frame.

An image processing method including: receiving a stream including a first-eye image and a second-eye image, corresponding to a frame of a three-dimensional (3D) image, wherein the first-eye image is an encoded frame that refers to a different frame of the 3D image; performing a first decoding of the first-eye image and the second-eye image; encoding the first decoded first-eye image and the first decoded second-eye image in response to a reverse playing operation of the stream; and performing a second decoding of the encoded first-eye image and the encoded second-eye image in response to the reverse playing operation of the stream, wherein the encoding includes encoding the first-eye image and the second-eye image so that neither of the encoded first-eye image and the encoded second-eye image refers to any different frame of the 3D image.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings.

Figure 1:
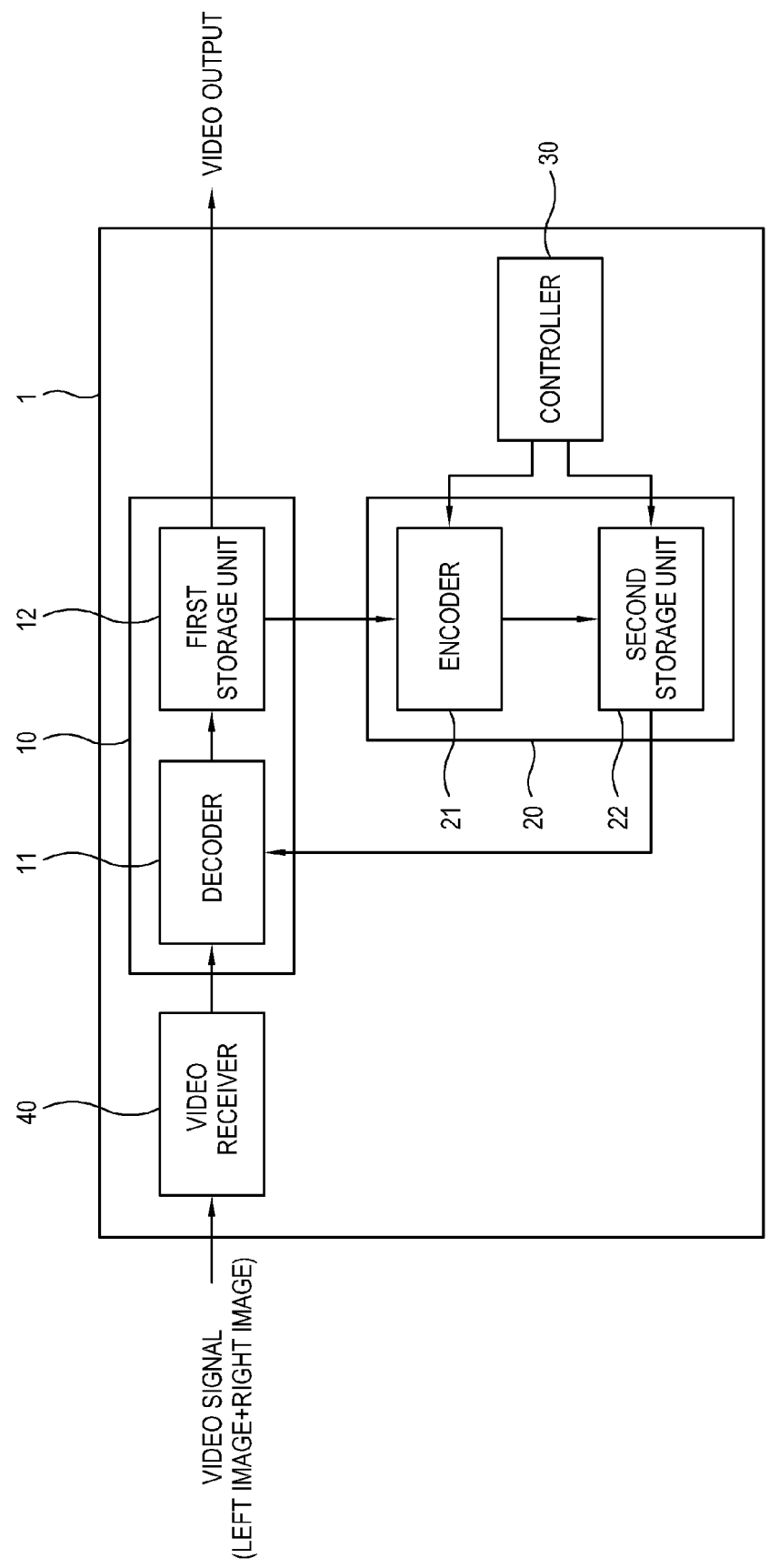
FIG. 1 is a block diagram of an image processing apparatus according to an exemplary embodiment.

FIG. 1 is a block diagram of an image processing apparatus 1 according to an exemplary embodiment.

Referring to FIG. 1, an image processing apparatus 1 includes a decoding unit 10, an encoding unit 20, a controller 30, and a video receiver 40. Also, the decoding unit 10 includes a decoder 11 and a first storage unit 12, and the encoding unit 20 includes an encoder 21 and a second storage unit 22. The image processing apparatus 1 shown in FIG. 1 may be implemented by a Blu-ray disc (BD) player, a compact disc (CD) player, a digital versatile disc (DVD) player, etc. The video receiver 40 receives a three-dimensional (3D) video signal containing a left image and a right image from any source, e.g., a storage medium such as a hard disk drive, etc. A 3D video signal includes a moving picture experts group (MPEG) stream divided into an I frame, a P frame, and a B frame. The received video signal is transmitted to the decoder 11. The decoder 11 serves as an MPEG decoder and decodes the received video signal to generate left and right images. The decoder 11 performs decoding for a reverse play as well as a forward play.

The decoded frame is output to the first storage unit 12. The first storage unit 12 may store an image as a unit of at least one or more groups of picture (GOP), which is a buffer of a frame image decoded by the decoder 11. An image stored in the first storage unit 12 is output to a display apparatus (not shown) according to a play operation, and the image stored in the first storage 12 is input to the encoding unit 20 according to a reverse play operation.

Figure 2:
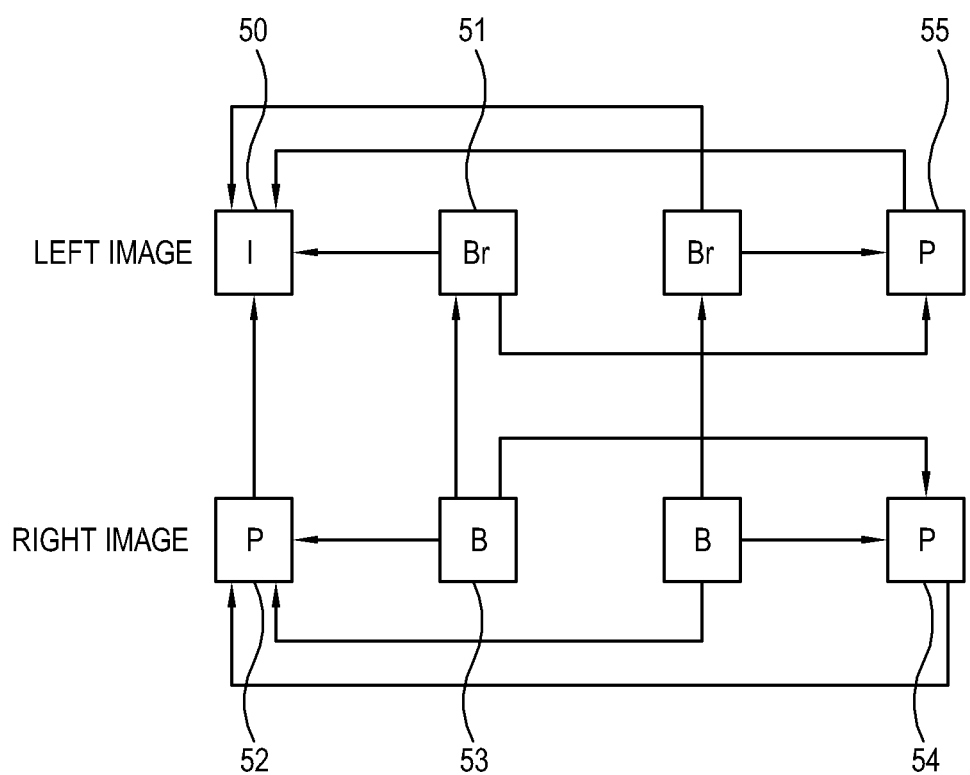
FIG. 2 illustrates an example of left and right images of an MPEG stream input to an image processing apparatus according to an exemplary embodiment.

FIG. 2 illustrates an example of left and right images of the MPEG stream input to the image processing apparatus 1 according to an exemplary embodiment. As shown in FIG. 2, a 3D image corresponding to the GOP containing the left and right images is transmitted from a source, e.g., a storage medium such as a Blu-ray disc, to the decoder 11 via the video receiver 40. As an example, the 3D image of the GOP may be achieved by an MPEG-4 multiview video coding (MVC) stream used in a 3D Blue-ray disc.

The 3D MPEG frames containing the left and right images includes an I frame 50 having no other reference images, P frames 54 and 55 referring to a previous frame, and B frames 51 and 53 referring to previous and following frames. Also, in the present exemplary embodiment, the B frame 53 of the right image refers to the B frame 51 of the left image, and the P frame 52 of the right image refers to the I frame 50 of the left image. To play the frame having the left and right images as shown in FIG. 2, the frame is decoded through the decoder 11, in which the decoding is performed in order of first decoding the I frame 50, then decoding the P frame 52 referring to the I frame 50, and then decoding the B frame 51 referring to the P frame 55 and the I frame 50 after the P frame 55 is decoded.

The frames containing the left and right images decoded through the decoder 11 by the above method when a play order is given is output via the fist storage unit 12, in which a pair of left and right image is displayed with a time lag therebetween to thereby display a 3D image. The decoder 11 not only performs the decoding for a play of an MPEG-4 MVC stream, but also performs the decoding for a reverse play.

If a user orders a trick mode constant-speed reverse play, the frames stored in the first storage unit 12 are input to the encoder 21. The controller 30 controls an encoding of at least one of P and B frames input to the encoder 21 into the I frame.

One of the left and right images is set to a base image BaseView, and the other of the left and right images is set to a dependent image referring to the base image. The P and B frames of the base image are encoded into the I frame. Also, the dependent image is encoded into the P frame referring to the encoded I frame. A detailed exemplary embodiment will be described with reference to FIG. 3.

Figure 3:
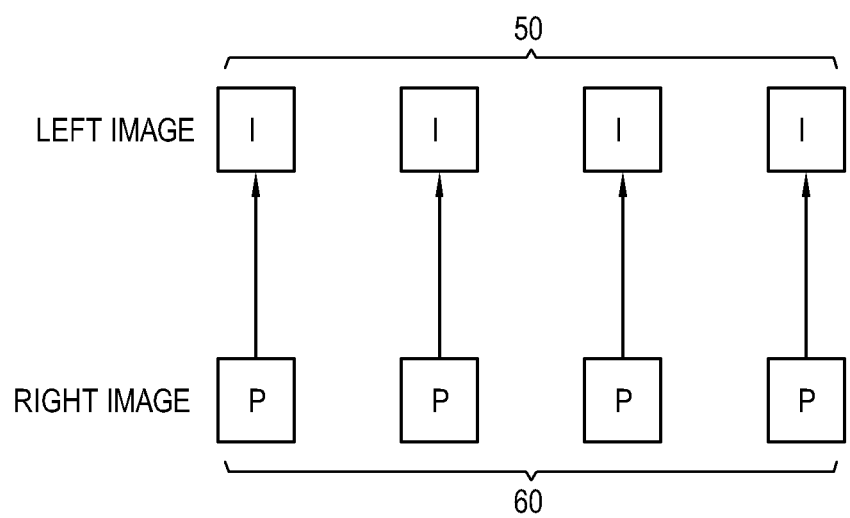
FIG. 3 illustrates an example of left and right images of an MPEG stream encoded in an image processing apparatus according to an exemplary embodiment.

FIG. 3 illustrates an example of left and right images of an MPEG stream encoded in an image processing apparatus according to an exemplary embodiment. When the MPEG stream including the encoded left and right images of FIG. 2 is decoded to form a full image and then encoded by the encoder 21, the controller 30 sets up the left image as the base image and the right image as the dependent image. Then, the controller 30 encodes the left image into only the I frame 50, and the right image into only the P frame 60. Alternatively, the base image and the dependent image are respectively set up as the right image and the left image, and then the right image and the left image may be respectively encoded into the I frame and the P frame. If the encoding is performed as above, the I frame of the base image can be independently decoded since it has no reference image in the pair of left and right images. Further, the P frame of the dependent image is encoded by referring to only the I frame of the corresponding left or right image forming a pair, and decoded by referring to only an adjacent I frame at the decoding, so that the P frame can be decoded regardless of other frames except the I frame forming a pair therewith. The controller 30 respectively encodes the base image and the dependent image into the I frame 50 and the P frame 60 with respect to the stream input to the encoder 21, and stores the encoded stream in the second storage unit 22. The second storage unit 22 is configured with a memory to store an image corresponding to at least one GOP. When the trick mode constant-speed reverse play is ordered, the controller 30 extracts a pair of left and right images one-by-one from the stream compressed by the encoder 21 in reverse order and transmits the extracted pair to the decoder 11, thereby performing the decoding. When the encoding is performed as above, a reference image is provided within a pair of left and right images, so that a smooth constant-speed reverse play can be performed since the decoding is possible with regard to any pair randomly extracted.

When the trick mode constant-speed reverse play is ordered, a currently played image group is transmitted from the first storage unit 12 to the encoding unit 20, and at the same time previous image groups are read from a source, e.g., a storage medium such as a Blu-ray disc, and input to the decoding unit 10. Thus, if the image group input to the encoding unit 20 is decoded and fully reverse-played, the previous image group stored in the first storage unit 12 is input to and encoded by the encoding unit 20 for the reverse play, and then decoded and displayed.

According to another exemplary embodiment, one of the left and right images is set up as the base image BaseView, and the other of the left and right images is also set up as the base image, so that the P and B frames of both the left and right images can be encoded into the I frame. A detailed description of another exemplary embodiment will be described with reference to FIG. 4.

Figure 4:
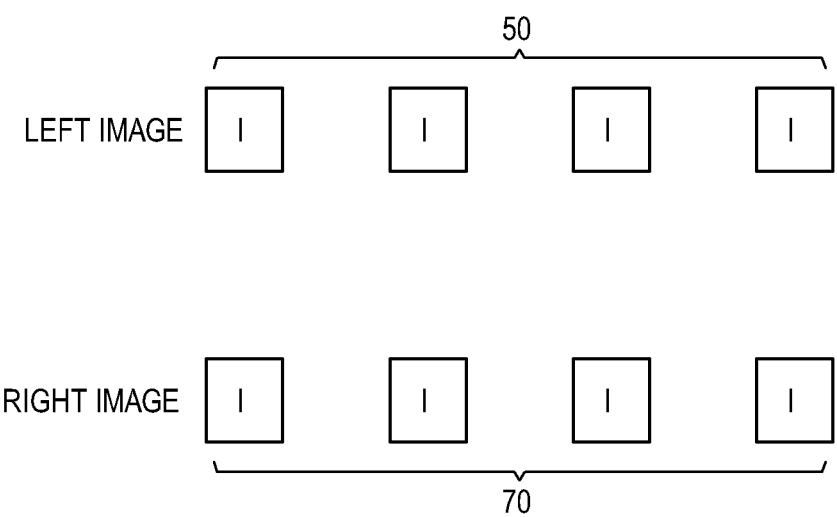
FIG. 4 illustrates an example of left and right images of an MPEG stream encoded in an image processing apparatus according to another exemplary embodiment.

FIG. 4 illustrates an example of left and right images of an MPEG stream encoded in an image processing apparatus according to another exemplary embodiment. The controller 30 may control both the left and right images to be respectively encoded into the I frames 50 and 70 as shown in FIG. 4 if the decoded frames of the left and right images are input to the encoder 21. The encoded frame is stored in the second storage unit 22 and both the left and right images can be independently decoded by extracting an arbitrary pair without having the reference images, thereby making the smooth constant-speed reverse play possible as shown in FIG. 3.

As described above, according to an exemplary embodiment, the controller 30 sets up the left and right images as the base and dependent images when a user inputs a reverse play order. The base image is encoded into the I frame, and the dependent frame is encoded into the P frame. Then, a pair of left and right images is extracted one by one in reverse order of the encoded image, and transmitted to the decoder 11. The decoder 11 decodes the pair of left and right images transmitted in reverse order, and stores it the pair in the first storage unit 12, thereby displaying the images. The controller 30 may have information about all streams stored in the encoding unit 20 so as to output a pair of streams corresponding to a random location when the constant-speed reverse play is ordered. For example, the controller 30 has location information, picture types, etc., of all streams. Further, when the constant-speed reverse play order is given, the controller 30 searches where a certain frame is located on the stream and begins a reverse play from the certain frame.

Figure 5:
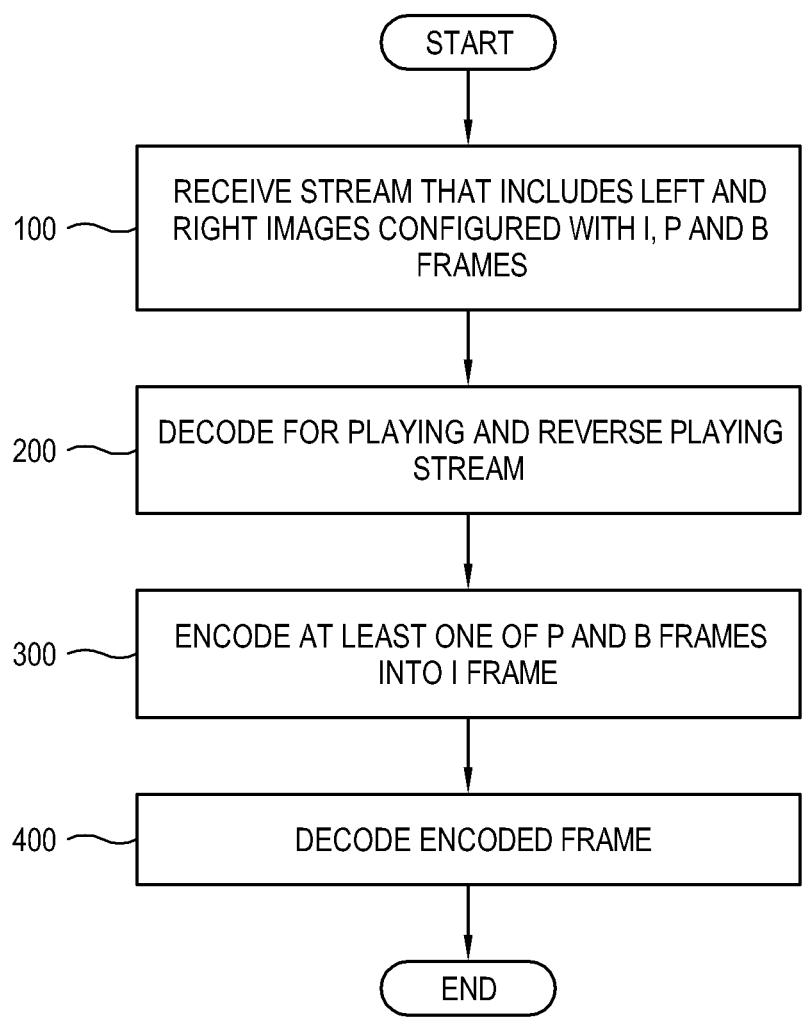
FIG. 5 is a flowchart of an image processing method according to an exemplary embodiment.
Figure 6:
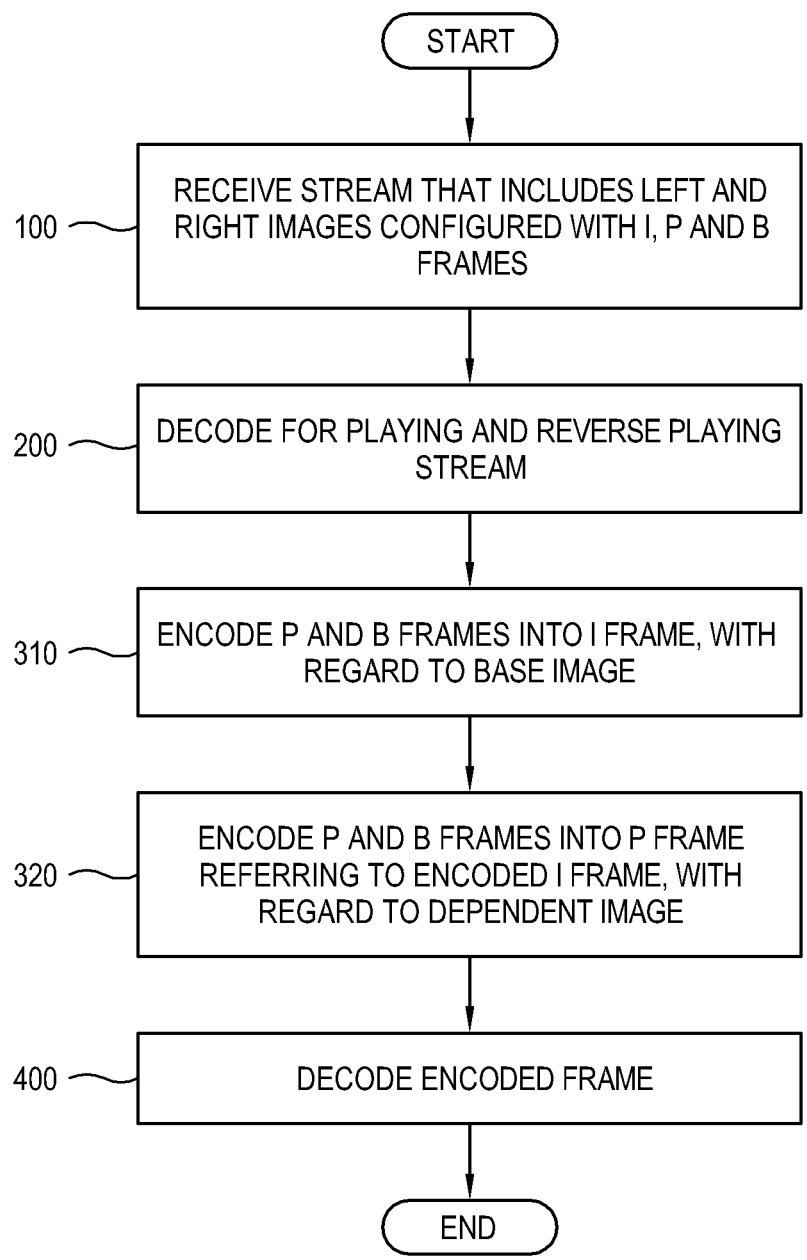
FIG. 6 is a flowchart of an image processing method according to an exemplary embodiment.
Figure 7:
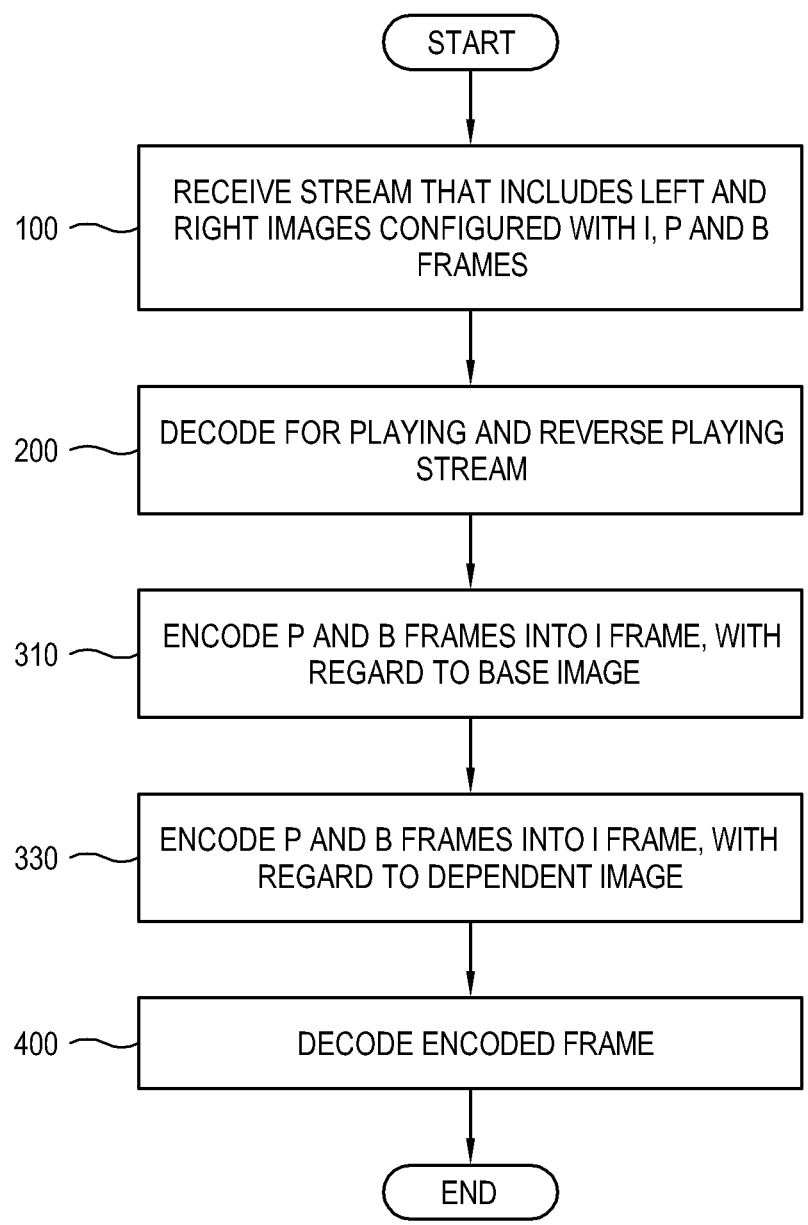
FIG. 7 is a flowchart of an image processing method according to another exemplary embodiment.

FIG. 5 is a flowchart of an image processing method according to an exemplary embodiment, FIG. 6 is a flowchart of an image processing method according to an exemplary embodiment, and FIG. 7 is a flowchart of an image processing method according to another exemplary embodiment.

Referring to FIGS. 5, 6 and 7, a stream that includes left and right images configured with I, P and B frames is received at operation 100.

For playing and reverse playing the stream, the decoding is performed at operation 200. If the decoding is completed, a full image configured with the left and right images is generated.

At least one of the P and B frames is encoded into an I frame at operation 300. In this case, with regard to a base image of a pair of left and right images corresponding to a frame of a 3D image, the P and B frames are encoded into the I frame at operation 310. With regard to a dependent image, the P and B frames are encoded into the P frame referring to the encoded I frame at operation 320. According to another exemplary embodiment, the P and B frames may be encoded into the I frame with regard to the dependent image at operation 330. A storage capacity used by the second storage 22 may differ between the case of encoding the dependent image into the P frame and the case of encoding the dependent image into the I frame. According to exemplary embodiments, it is possible to extract one pair of images to decoding regardless of other images.

The frame encoded for the reverse play is decoded at operation 400. The decoded image is stored in the first storage unit 12 and displayed.

According to exemplary embodiments, decoding is possible even if a random pair of left and right images of an encoded and stored stream is extracted, so that not only a smooth constant-speed reverse play, but also a reverse play at an arbitrary play speed can be enabled in an MPEG stream adopted by a high definition 3D image playing medium.

While not restricted thereto, exemplary embodiments can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, exemplary embodiments may be written as computer programs transmitted over a computer-readable transmission medium, such as a carrier wave, and received and implemented in general-use or special-purpose digital computers that execute the programs. Moreover, one or more units of the image processing apparatus 1 can include a processor or microprocessor executing a computer program stored in a computer-readable medium.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. An image processing apparatus comprising:
   a video receiver which receives a stream comprising a first-eye image and a second-eye image, corresponding to a frame of a three-dimensional (3D) image, wherein the first-eye image is one of an I frame, a P frame and a B frame, and the second-eye image refers to the first-eye image;
   a decoding unit which performs a first decoding of the first-eye image and the second-eye image;
   an encoding unit which encodes the first decoded first-eye image and the first decoded second-eye image; and
   a controller which controls the encoding unit to encode the first decoded first-eye image into an I frame and to encode the first decoded second-eye image into a P frame that refers to the encoded first-eye image, and controls the decoding unit to perform a second decoding of the encoded first-eye image and the encoded second-eye image—in response to a reverse playing operation of the stream.

2. The image processing apparatus according to claim 1, wherein:
   one of the first decoded first-eye image and the first decoded second-eye image is a base image, and another of the first decoded first-eye image and the first decoded second-eye image is a dependent image dependent on the base image; and
   the controller controls the encoding unit to encode the base image into an I frame.

3. The image processing apparatus according to claim 2, wherein:

the controller controls the encoding unit to encode the dependent image into a P frame that refers to the encoded base image; and the first decoded second-eye image is the dependent image.

4. The image processing apparatus according to claim 2, wherein:

the controller controls the encoding unit to encode the dependent image into an I frame; and the first decoded second-eye image is the dependent image.

5. The image processing apparatus according to claim 2, wherein the decoding unit first decodes the first-eye image with reference to an image of a different frame of the 3D image.

6. The image processing apparatus according to claim 3, wherein:

the decoding unit first decodes the first-eye image with reference to an image of a different frame of the 3D image; and the controller controls the encoding unit to encode the dependent image into a P frame that refers only to the encoded base image from among other images of the stream.

7. The image processing apparatus according to claim 1, wherein the first-eye image is the P frame.

8. The image processing apparatus according to claim 1, wherein the first-eye image is the B frame.

9. An image processing method comprising:

receiving a stream comprising a first-eye image and a second-eye image, corresponding to a frame of a three-dimensional (3D) image, wherein the first-eye image is one of an I frame, a P frame and a B frame, and the second-eye image refers to the first-eye image;

performing, by a processor, a first decoding of the first-eye image and the second-eye image;

encoding the first decoded first-eye image and the first decoded second-eye image in response to a reverse playing operation of the stream; and performing a second decoding of the encoded first-eye image and the encoded second-eye image in response to the reverse playing operation of the stream, wherein the encoding comprises encoding the first decoded first-eye image into an I frame and to encode the first decoded second-eye image into a P frame that refers to the encoded first-eye image.

10. The image processing method according to claim 9, wherein:

one of the first decoded first-eye image and the first decoded second-eye image is a base image, and another of the first decoded first-eye image and the first decoded second-eye image is a dependent image dependent on the base image; and the base image is encoded into an I frame in the encoding.

11. The image processing method according to claim 10, wherein:

the first decoded second-eye image is the dependent image; and the encoding further comprises encoding the dependent image into a P frame that refers to the encoded base image.

12. The image processing method according to claim 10, wherein:

the first decoded second-eye image is the dependent image; and the encoding further comprises encoding the dependent image into an I frame.

13. A non-transitory computer readable recording medium having recorded thereon a program executable by a computer for performing the method of claim 9.

* * * * *